US007529291B2

(12) United States Patent
Dutka (10) Patent No.: US 7,529,291 B2
(45) Date of Patent: May 5, 2009

(54) METHODS AND STRUCTURES FOR RAPID CODE ACQUISITION IN SPREAD SPECTRUM COMMUNICATIONS

(75) Inventor: Stephen Charles Dutka, Aurora, CO (US)

(73) Assignee: Raytheon Company, Waltham, MA (US)

( * ) Notice: Subject to any disclaimer, the term of this patent is extended or adjusted under 35 U.S.C. 154(b) by 928 days.

(21) Appl. No.: 10/822,972

(22) Filed: Apr. 13, 2004

(65) Prior Publication Data

US 2005/0254558 A1 Nov. 17, 2005

(51) Int. Cl.
*H04B 1/707* (2006.01)
*H04J 13/04* (2006.01)

(52) U.S. Cl. .................. 375/149; 375/145

(58) Field of Classification Search ......... 375/136–137, 375/142–145, 147–150, 152, 343; 370/209, 370/335, 342; 708/250, 252, 25, 256, 410, 708/422, 426
See application file for complete search history.

(56) References Cited

U.S. PATENT DOCUMENTS

| 5,394,532 | A | | 2/1995 | Belsan |
| 5,396,596 | A | | 3/1995 | Hashemi et al. |
| 5,920,591 | A | * | 7/1999 | Fukasawa et al. ........... 375/142 |
| 5,943,287 | A | | 8/1999 | Walton |
| 6,009,118 | A | | 12/1999 | Tiemann et al. |
| 6,148,414 | A | | 11/2000 | Brown et al. |
| 6,195,770 | B1 | | 2/2001 | Walton |
| 6,230,221 | B1 | | 5/2001 | Mulvey et al. |
| 6,289,401 | B1 | | 9/2001 | Tuccio et al. |
| 6,385,681 | B1 | | 5/2002 | Fujimoto et al. |
| 6,389,494 | B1 | | 5/2002 | Walton et al. |
| 6,397,281 | B1 | | 5/2002 | MacLellan et al. |
| 6,418,511 | B1 | | 7/2002 | Zani et al. |
| 6,496,474 | B1 | * | 12/2002 | Nagatani et al. ............ 370/208 |
| 6,542,478 | B1 | * | 4/2003 | Park .......................... 370/308 |
| 6,571,310 | B1 | | 5/2003 | Ottesen et al. |
| 7,221,695 | B1 | * | 5/2007 | Hwang et al. ............... 375/130 |

(Continued)

FOREIGN PATENT DOCUMENTS

WO WO 02/13476 A1 2/2002

(Continued)

OTHER PUBLICATIONS

Liebhart, Manfred, Brenner, Eugen and Bogaerts, Andre: "A Study of an SCI Switch Fabric", 1997 IEEE (pp. 162-169).

(Continued)

*Primary Examiner*—Young T. Tse
(74) *Attorney, Agent, or Firm*—Glenn H. Lenzen (57) ABSTRACT

Methods and structure for improved speed in pseudo-noise code acquisition. A receiver may include features to evaluate multiple potential pseudo-noise (PN) digital code sequences in parallel to more rapidly acquire the PN code utilized by a corresponding transmitter. Multiple PN code generators may operate substantially in parallel each pre-loaded to generate one of the set of possible Gold codes for the shift register tap configuration. One of the generators will correlate with the sequence generated by the transmitter by exceeding a predetermined correlation threshold value. That PN code sequence may be identified as the correct PN code sequence for decoding data received on the communication medium intended for the particular user using the PN code. As compared to prior sequential techniques, features and aspects hereof more rapidly acquire the PN digital code sequence utilized by an associated transmitter.

23 Claims, 6 Drawing Sheets

U.S. PATENT DOCUMENTS

2002/0015437 A1* 2/2002 Li et al. .................... 375/146
2002/0181558 A1* 12/2002 Ogawa et al. ............... 375/147
2003/0193914 A1 10/2003 Lomp et al.

OTHER PUBLICATIONS

Patterson, David A. and Hennessy, John L.; "Computer Architecture A Quantitative Approach", 2d Ed., Morgan Kaufman Publishers, San Francisco pp. 522-525, 573.

Lam, Alex W. and Tantaranta, Sawasd; "Mean Acquisition Time for Noncoherent PN Sequence Sequential Acquisition Schemes"., MILCOM'93 Conference Record, Boston, Oct. 1993, IEEE pp. 784-788.

Holmes, Jack K. and Chen, Chang C.; Acquisition Time Performance of PN Spread-Spectrum Systems, Aug. 1977 IEEE Transactions on Communications, vol. Com-25, No. 8(pp. 778-784.

Cheng, Unjeng, Hurd, William J. and Statman, Joseph I.; "Spread-Spectrum Code Acquisition in the Presence of Doppler Shift and Data Modulation," IEEE Transactions on Communications, vol. 38, No. 2, Feb. 1990 pp. 241-250.

Li, Jianlin and Tantaratana, Sawasd, "Optimal and Suboptimal Coherent Acquisition Schemes for PN Sequences with Data Modulation", IEEE Transactions on Communications, vol. 43, No. 2/3/7, Feb./Mar./Apr. 1995 pp. 554-564.

Davisson, Lee D. and Flikkema, Paul G., "Fast Single-Element PN Acquisition for the TDRSS MA System", IEEE Transactions on Communications, vol. 36, No. 11, Nov. 1988 pp. 1226-1235.

Kaplan, Elliott D. (Editor) "Understanding GPS Principles and Applications", 0-89006-793-7 (1996) Artech House, Boston London, Figs. 5.2, 5.3, 5.13.

Dixon, Robert C. "Spread Spectrum Systems" 2d Ed. 0-471-88309-3 (1984) John Wiley & Sons, New York pp. 230-232.

Ward, Robert B. , "Acquisition of Pseudonoise Signals by Sequential Estimation" IEEE Transactions on Communication Technology, vol. Com-13, No. 4, Dec. 1965, pp. 475-483.

Nasa, "Landsat 7 Mission and Data Pointer BCH Decoder Prototype Description", Nov. 18, 1994 pp. 1-33.

Otung, Ofiok, "Communication Engineering Principles", Feb. 2001, pp. 389-403.

Dinan, Esmael H. and Jabbari, Bijan, "Spreading Codes for Direct Sequence CDMA and Wideband CDMA Cellular Networks", IEEE Communications Magazine, Sep. 1998, pp. 48-54.

Schlegel, Christian, "Coded Asynchronous CDMA and Its Efficient Detection", IEEE Transactions on Information Theory, vol. 44, No. 7, Nov. 1998, pp. 2837-2847.

Schwartz, Richard, "An Introduction to Linear Recursive Sequences in Spread Spectrum Systems", Filtronic Sigtek Inc. rev. Dec. 2001.

"Linear Feedback Shift Registers—Implementation, M-Sequence Properties, Feedback Tables" New Wave Instruments, http://www.newwaveinstruments.com/resources/articles/m_sequence_linear_feedback_shift_register_lfsr.htm, 2002, pp. 1-8.

Prasad, Ramjee and Ojanperä, Tero, "An Overview of CDMA Evolution toward Wideband CDMA" IEEE Surveys, Fourth Quarter 1998, vol. 1, No. 1, pp. 2-29.

Haykin, Simon, "Adaptive Digital Communication Receivers" IEEE Communications, Dec. 2000.

Laipac Technology, Inc. "TF50 GPS & Glonass User's Manual", Apr. 2001, http://www.laipac.com pp. 1-45.

Applied Wave Research Inc. "Acolade Application Note, Modeling GPS Receivers in ACOLADE", 2000 p. 1-18.

Schiff, Maurice, "Spread Spectrum: Basic Concepts and Applications", www.TechOnline.com, http://www.xsilogy.com/main/support/resources/SpreadSpectrumConcepts.html.

Schiff, Maurice ,"Spread Spectrum: Codes, Processing Gain, and Synchronization", www.TechOnline.com http://www.xsilogy.com/corporate/support/guides/codes.html.

Cheng, Unjeng, "Performance of a Class of Parallel Spread-Spectrum Code Acquisition Schemes in the Presence of Data Modulation", IEEE Transactions on Communications, vol. 36, No. 5, May 1988, pp. 596-604.

Glisic, Savo G., Poutanen, Tortsi J., et al., New PN code Acquisition Scheme for CDMA Networks with Low Signal-to-Noise Ratios, IEEE Transactions on Communications, vol. 47, No. 2, Feb. 1999, pp. 300-310.

Dicarlo, David M. and Weber, Charles L., "Statistical Performance of Single Dwell Serial Synchronization Systems", IEEE Transactions on Communications, vol. Com-28, No. 8, Aug. 1980, pp. 1382-1388.

Su, Yu T., "Rapid Code Acquisition Algorithms Employing PN Matched Filters" IEEE Transactions on Communications, Vo 36, No. 6, Jun. 1988, pp. 724-733.

Li, Jianlin and Sawasd Tantaratana, "Coherent Serial Acquisition Schemes for PN Sequences with Data Modulation", IEEE, Oct. 1992, pp. 623-627.

Lam, Alex W., Tantaratana, Sawasd, et al., "Effects of Ricean Fading and Data Modulation on Noncoherent PN Sequence Sequential Acquisition Schemes", pp. 0417-0421.

Lee, Yong-Hwan and Tantaratana, Sawasd, Sequential Acquisition of PN Sequences for DS/SS Communications: Design and Performance, IEEE Journal on Selected Aeras in Communications, vol. 10, No. 4, May 1992, pp. 750-759.

Samanchuen, Taweesak and Tantaratana, Sawasd, "A Closed-Loop Noncoherent Pseudo-Noise Acquisition Scheme for Direct-Sequence Spread-Spectrum Systems" IEEE, Proceedings of the 1998 Asia-Pacific Conference on Circuits and Systems, pp. 97-100.

Mauss, Oliver C., Classen, Ferdinand, et al., "Carrier Frequency Recovery for a Fully Digital Direct-Sequence Spread-Spectrum Receiver: A Comparison" In Proceedings of the IEEE International Conference on Vehicular Technology, May 1993, pp. 392-395.

Koolpiruck, Diew and Tantaratana, Sawasd, "A Joint PN Phase and Carrier Phase Acquisition Scheme Using an Auxiliary Sequence for DS/SS System", In IEEE International Conference on Communications, Jun. 11-15, 2001, Helsinki, Finland. vol. 2, pp. 535-539.

Flikkema, Paul G. and Davisson, Lee D., "Performance Analysis of a Spread Spectrum Acquisition Algorithm For Satellite Mobile Radio", Conference Record, IEEE MILCOM' 92 San Diego, Oct. 1992, pp. 0115-0119.

Chen, Kwang-Chen and Davvison, Lee D., "On the Loop Noise Bandwidth of SCCL", IEEE Transactions on Communications, vol. 42, No. 11, Nov. 1994, pp. 2938-2941.

Wong, Tan F. "Spread Spectrum & CDMA, Chapter 5 Spreading code Acquisition and Tracking", pp. 5.1-22, http://www.wireless.ece.ufl.edu/twong/Notes/CDMA/ch5.pdf.

Katz, Marcos D. and Glisic, Savo, "Modeling of Code Acquisition Process in CDMA Networks—Asynchronous Systems", IEEE Journal on Selected Areas of Communications, vol. 18, No. 1, Jan. 2000, pp. 73-86.

Chapman, Ken, Harty, Paul, et al., "CDMA Matched Filter Implementation in Virtex Devices", XLINX XAPP212 (v1.2) Jan. 10, 2001, pp. 1-12.

Ward, Robert W. and Yiu, Kai P., "Acquisition of Pseudonoise Signals by Recursion-Aided Sequential Estimation", IEEE Transactions on Communications, vol. Com-25, No. 8, Aug. 1977, pp. 784-794.

Kim, J.Y. and Lee, J.H.; "Performance of a Parallel Acquisition Scheme for a Spread-Spectrum Packet Radio Communication", IEEE 1994, pp. 770-774.

Wang, J. and Yang, C.; "Sequential Detection for Code Acquisition with and without Data Modulation On", IEEE 1993, pp. 1095-1099.

Ward, R.B., "Acquisition of Pseudonoise Signals by Sequential Estimation", Dec. 1965, pp. 475-483.

Weinberg, Aaron, "Search Strategy Effects on PN Acquisition Performance", Stanford Telecommunications, Inc., McLean, Virginia,pp. F1.5.1-F1.5.5.

Lindholm, James H., "An Analysis of the Pseudo-Randomness Properties of Subsequences of Long $m$-Sequences", IEEE Transactions on Information Theory, vol. IT-14, No. 4, Jul. 1968, pp. 569-576.

Kim, Hong Gil, et al., "Double-Dwell Serial-Search PN Code Acquisition Using a Nonparametric Detector in DS/CDMA Systems" MILCOM 1999—IEEE Military Communications Conference, No. 1, Oct. 1999, pp. 571-574.

Yang, Lie-Liang and Hanzo , Lajos , "Serial Acquisition Techniques for DS-CDMA SIgnals in Frequency-Selective Multi-User Mobile Channels", Proc. of the IEEE 49th Vehicular Technology Conf., Houston, TX, May 1999 (pp. 2398-2402), pp. 1-6.

Gilsic, Savo G., et al., "A New Approach to Long Code Acquisition in Spread Spectrum Radio", IEEE, Milcom 1991 pp. 1281-1285.

Moshavi, Shimon, "Multi-User Detection for DS-CDMA Communications" IEEE Communications Magazine, Oct. 1996, pp. 124-136.

Polydoros, Andreas and Glisic, Savo, "Code Synchronization: A Review of Principles and Techniques" In Proceedings of the ISSSTA '94, Oulu, Finland, Jul. 1994. IEEE, pp. 115-137.

Gumacos, Constantine, "Analysis of an Optimum Sync Search Procedure", IEEE Transactions on Communications Systems Mar. 1963, pp. 89-99.

Braun, Walter R., "Performance Analysis for the Expanding Search PN Acquisition Algorithm", IEEE Transactions on communications, vol. Com-30, No. 3, Mar. 1982, pp. 424-435.

Dicarlo, David M. and Weber, Charles L., "Multiple Dwell Serial Synchronization of Pseudonoise Signals" May 1979, IEEE pp. 34.4.1-34.4.5.

Pandit, M., "Mean acquisition time of active- and passive-correlation acquisition systems for spread-spectrum communication systems", IEEE Proc. vol. 128, Pt. F. No. 4 Aug. 1981, pp. 211-214.

Su, Szu-Lin and Yen, Nan-Yang, "Acquisition Performance of PN Synchronization Loop for DS-SS Signals with Doppler Shift", IEICE Trans. Fundamentals, vol. E80-A, No. 12, Dec. 1997, pp. 2372-2381.

Meel, J., "Spread spectrum (SS)", Sirius Communications—Rotselaar—Belgium, V2, Dec. 1999, pp. 2-33.

Cheng, Unjeng, "Performance of a Class of Parallel Spread-Spectrum Code Acquisition Schemes in the Presence of Data Modulation", IEEE Transactions on Communications, vol. 36, No. 5, May 1988, pp. 598-604.

Lucke, Lori and Kazi, Sabera, "Industry News: Minnetronix Publications, A Convolutionally-Coded Adaptive CDMA Receiver Architecture" http://www.minnetronix.com/industry_news/publications/CDMA_receiverarchitecture.shtml.

Gold, Robert, "Optimal Binary Sequences for Spread Spectrum Multiplexing", Magnavox Research Laboratories, IEEE Transactions on Information Theory, vol. IT-13, pp. 619-621.

\* cited by examiner

METHODS AND STRUCTURES FOR RAPID CODE ACQUISITION IN SPREAD SPECTRUM COMMUNICATIONS

BACKGROUND OF THE INVENTION

1. Field of the Invention

The invention broadly concerns digital communication systems, such as spread spectrum systems. More specifically, reduction of the interference potential of relatively low-rate digital signals to other systems sharing the same frequencies is facilitated by spreading the low-rate digital data with a high-rate digital spreading sequence using pseudo-noise codes, for example, as used in Space Data communication systems.

2. Discussion of Related Art

In general, electronic communication systems transmit information by modulating an electronic signal representative of the data over a communication medium. A transmitting portion of such a communications system converts or modulates the digital information, i.e., baseband information, into a corresponding modulated signal for transmission through the communication medium. A receiving element receives the transmitted modulated signal and converts or demodulates the signal into the original digital information.

A variety of communication media may be used for transmitting the modulated signal. For example, the modulated signal may be transmitted through air or space utilizing radio frequency (RF), or using laser energy on optical fibers. RF transmissions are usually regulated by governmental authority and limited to a band of frequencies that is determined by regulatory and technology-based requirements. The range of frequency over which a communications system operates is often referred to as the bandwidth of the communication medium.

It is an ongoing problem in space communication systems to improve utilization of the available frequency bands. One way of increasing utilization is to multiplex a plurality of simultaneous users over the band with little or no mutual interference. Digital and analog signal processing techniques may facilitate improved bandwidth utilization.

One common digital signal processing technique is spread spectrum communication, which may be defined as any processing technique that digitally encodes the data for transmission in a format which disperses the data over the bandwidth. A spread spectrum transmission is such that multiple users may operate within the available bandwidth while incurring minimal interference from other users who are simultaneously using the same bandwidth. Each receiver decodes the received information in such a manner that each user's encoded data may be digitally extracted from the combined transmissions on the same frequency band or bandwidth.

Spread Spectrum techniques use a digital code to encode the data for transmission. In general, the user avails a transmitter-receiver pair including a transmitter element that spreads the data for transmission using a digital code. This code is temporally unique on the system bandwidth. A corresponding receiving element receives the spread information and despreads the transmission to recover the original transmitted data, i.e., the baseband information. In most instances, the receiving element must identify and use, for purposes of decoding the modulated transmission, the same code that the transmitting element has used to encode the baseband information in forming the modulated transmission. Other transmitter/receiver pairs may utilize available bandwidth on the same communication medium. The elements of the digital spreading codes are often referred to as "chips," which are distinct from "bits" referring to units of user data.

A variety of digital spreading code types are generally known in the art. Collectively, all such codes may be referred to as pseudo-noise ("PN") signals or pseudo-random noise ("PRN") signals. The encoded information of one user is "spread" over the available bandwidth, such that the signal appears to be random noise having lower interference potential to any other users of the medium. Well known digital filtering techniques use the principle of processing gain to extract encoded information for the intended user without interference from the other users of the bandwidth.

Gold codes are one particular type of PN code. Gold codes are well understood by those skilled in the art, for example, as described in *Optimal Binary Sequences for Spread Spectrum Multiplexing*, IEEE Trans. Info. Theory, vol. IT-B, October, 1967, pp. 619-21 which is hereby incorporated by reference. In general, Gold codes provide a large number of codes and help minimize interference between users using the available bandwidth of the communication link. Gold codes are frequently utilized in GPS (global positioning system) satellite communications, in other satellite communication applications, and in such consumer communication applications as code-division multiple-access (CDMA), cellular radio and telephony.

Although PN codes advantageously provide one way to distinguish between multiplexed spread spectrum communications, it is problematic that a time delay factor may be associated with the use of PN codes. In certain spread spectrum communication systems, the receiver may first acquire the PN code signal by adapting to phase shifts in the communicated signal. Techniques for such code acquisition or bit synchronization using serial search methods are well known. Although the receiving element may know which PN code is being used to encode the data, the receiver may not be synchronized with the transmission of encoded units of information. In other words, the receiver needs to synchronize with individual codes that are located in a received stream of chips. Once the code is so acquired, the receiver may continue decoding the received information in synchrony; however, this synchronization process takes time. Code acquisition delays may prevent full utilization of the available bandwidth More particularly, many CDMA communication systems use what is known as correlation receiver architecture to acquire the transmitted code sequences. This architecture acquires the code by receiving an appropriate number of chips, which the system presumes represent the utilized PN code. If the received chips appear to correlate to an expected encoded data bit value of "1" or "0" within a desired threshold of correlation, then the PN code has been acquired and decoding of data continues. If the presumed PN code does not adequately correlate to an expected data value, additional chips may be received and the sense testing for "1" or "0" repeats until acceptable correlation indicates that the PN code is acquired. Design and operation of such correlation receivers are generally known in the industry, for example, as described in E. Kaplan, Artech House, GPS receivers (1996) (see FIGS. 5.2, 5.3 and 5.13, *Understanding GPS Principles and Applications*).

Another general synchronization approach known in the art is to apply a matched filter that samples the incoming stream by shifting it through a shift register and comparing the shift register against an expected repeating sequence until it recognizes the expected sequence. This approach is not compatible with complex PN codes, such as Gold codes, because the repeating sequence may be extremely long and hence render a matched filter approach impractical.

Another approach suggested by Ward in *Acquisition of Pseudonoise Signals by Sequential Estimation*, (IEEE Trans. on Comm. Technology, Col. COM-13, No. 4, December 1065, pp. 475-483), is often referred to simply as sequential estimation. This approach differs from that of the correlation receiver architecture, which requires active closed-loop control of the rate and the relative time delay of a locally-generated code sequence that is used, as described above, to serially search for and achieve synchrony with the received chip sequence. In contrast, the sequential estimation receiver of Ward contains one code generator that is immediately in synchrony with the received chip sequence following receipt and logic-loading of the N-th chip. Therefore, the sequential estimation receiver advantageously does not have to search for synchronism as does a correlation receiver. Moreover, the correlation receiver must continually make active adjustments to its closed-loop to maintain synchrony with the received chip sequence. The code generator in the sequential estimation receiver of Ward is clocked by the receiver's timing recovery circuitry, which derives its timing from the received chip sequence so that changes in the rate of the received chip sequence, e.g., rate changes due to Doppler effects, are self-compensating. Though sequential estimation provides numerous benefits over correlation receivers, a particular problem with these known approaches arises in their application to Gold codes.

In general, a Gold code generator comprises two N-stage shift registers. Various ones of the stages (i.e., the "taps") may be summed modulo-2 and the sum applied as feedback into the shift registers. The output of the two shift registers, which is the modulo-2 sum of the respective taps, may be summed modulo-2 to generate the Gold code output of the generator. By configuring the taps of the registers and by pre-loading the shift registers with particular values, the Gold codes generated by the generator may be varied. Since Gold codes represent the modulo-2 sum of two values, each received chip represents the modulo-2 sum of two bits in the paired shift registers that make up a Gold code generator. The techniques for sequential estimation as taught by Ward do not easily adapt to Gold codes, as used for spread spectrum communication systems. The presently known techniques would require significant additional processing of received chips to acquire desired code synchronization. Although Gold codes provide the benefit of improved spreading and separation of multiple users, and hence better bandwidth utilization, code acquisition of Gold codes from a received data stream is relatively more complex and time consuming. This necessitates the expenditure of extended time for achieving synchrony or lock. The time delay is undesirable in certain high speed applications where acquisition of the Gold or PN code must be attained more quickly.

It is evident from the above discussion that a need exists for improved methods and structures to provide rapid acquisition of pseudo-noise digital codes in spread spectrum digital communication systems. In addition, a simple structure for improved Gold code acquisition in spread spectrum digital communication systems is of particular utility.

SUMMARY OF THE INVENTION

The present invention solves the above and other problems, thereby advancing the state of the useful arts, by providing methods and structure for simultaneously operating multiple Gold code generators substantially in parallel. This achievement may advantageously reduce the time required for code acquisition in spread spectrum communication systems.

More specifically, aspects hereof provide for multiple Gold code generator components that are operable in parallel on received digital codes or 'chips.' The Gold code generators may operate simultaneously from a preconfigured state where each one of multiple Gold code generators is pre-loaded with a different value. Thus, each generator may synchronize or lock with the transmitted codes in a received sequence of chips corresponding to the preconfigured state. By operating a plurality of Gold code generators in parallel, features hereof may facilitate rapid synchronization.

One feature hereof provides a receiver that is adapted for coupling to the communication medium. The receiver may contain or communicate with a plurality of PN code generators each having an input signal path and an output signal path. Load logic may be coupled to the input signal path of each of the plurality of PN code generators. The load logic may be adapted to receive chips from the communication medium and adapted to pre-load the plurality of PN code generators with information that is obtained from the received chips. The receiver may also be adapted to operate the plurality of PN code generators substantially in parallel following pre-loading thereof. Selection logic may be coupled to the output signal path of each of the plurality of PN code generators to select one of the PN code generators that is correlated to a user transmission, i.e., to provide a correlated PN code generator. A decoder may be coupled to the selection logic for decoding data received from the communication medium using the correlated PN code generator.

Another aspect hereof provides that the plurality of PN code generators include a Gold code generator. By way of example, a Gold code receiver may include a plurality of Gold code generators that operate substantially in parallel, together with a selector for selecting a correlated generator from the plurality of Gold code generators to use for decoding of received chips. In one embodiment, the plurality of generators may comprise $2^N$ Gold code generators. Each Gold code generator may include a first shift register having N stages; and a second shift register having N stages. Here N may be the number of stages in each shift register of each generator. A pre-loader may be coupled to the plurality of Gold code generators for pre-loading shift registers in each generator prior to operating the generators such that each generator is pre-loaded with a unique pre-load value selected from $2^N$ possible values where N is the number of stages in shift registers in the each Gold code generator.

The load logic may place the shift registers into a preconfigured state, for example, by adapting the PN or Gold code generators for response to receipt of a 0 chip value or a 1 chip value. By way of example, in a first group of the PN code generators, the load logic may configure the shift registers with first logic for response to receipt of a 0 chip value. The shift register configuration entails the load logic placing a logic 0 bit value into the first N bit shift register and into the second N bit shift register of each generator. Additionally, a second group of the PN code generators may be configured with second logic for response to a logic 1 value. The response is facilitated by the load logic placing a logic 1 value into the first N bit shift register and into the second N bit shift register of each generator of the second group of the PN code generators. One aspect hereof provides that the load logic may include indexing logic to selectively associate each generator with the first group or with the second group.

Other schemes for preconfiguring the shift registers may include the load logic being adapted to load a logic 0 bit value into the first N bit shift register and to load a logic 1 bit value into the second N bit shift register of each generator of a third group of PN code generators. Another alternative is to load a logic 1 value into the first N bit shift register of a fourth group of PN code generators and a logic 0 bit value into the second N bit shift register of each generator of the fourth group. These instrumentalities, by continuation of the foregoing examples, may assure that all possible combinations of N bits are preloaded into registers of the plurality of PN code generators. Another aspect hereof provides that the load logic may include indexing logic to selectively associate each generator with the third group or with the fourth group.

The load logic may further include feedback logic, responsive to completion of the pre-loading of the plurality of PN code generators, to selectively couple the output signal path of each PN code generator to the corresponding input signal path of each PN code generator to permit operation of the plurality of PN code generators.

The selection logic may further include autocorrelation detection logic to determine the autocorrelation level of each of the plurality of PN code generators and threshold comparison logic to compare the autocorrelation level of each of the plurality of PN code generators to a predetermined threshold to identify the correct PN code generator.

One way to enhance code selection speed is to use a pre-loader coupled to the plurality of PN code generators for pre-loading the first and second shift register in each generator prior to operating the generators. Additionally, feedback logic that is responsive to the pre-loader and associated with each PN code generator may selectively couple an output of each Gold code generator to an input of each generator.

The selector may further include a correlation coupled to an output of each generator to determine the correlation of each generator to a sequence of received chips, such that the selector is operable to select the generator best correlated to the sequence of received chips. By way of example, the correlator may further include a threshold comparator that compares the correlation of each generator with a predetermined threshold correlation level.

Still another feature hereof provides a method that is operable in a digital communication receiver. The method includes the step of receiving digitally encoded information from a communication medium such that a PN code is used to spread the information over available communication bandwidth of the communication medium. The method may further include operating a plurality of PN code generators substantially in parallel with one another to acquire the correct PN code sequence from the received information. The method may further include decoding received information using the best correlated PN code generator.

Another aspect hereof provides the step of pre-loading shift registers in each PN code generator prior to operating each PN code generator.

Another aspect hereof provides that the step of pre-loading may further include deriving the value pre-loaded into each generator from N received chips of the received information.

Another aspect hereof further provides for selecting the best correlated PN code generator by comparing outputs from each of the plurality of PN code generators with a sequence of chips of the received information.

DETAILED DESCRIPTION OF THE DRAWINGS

Figure 1:
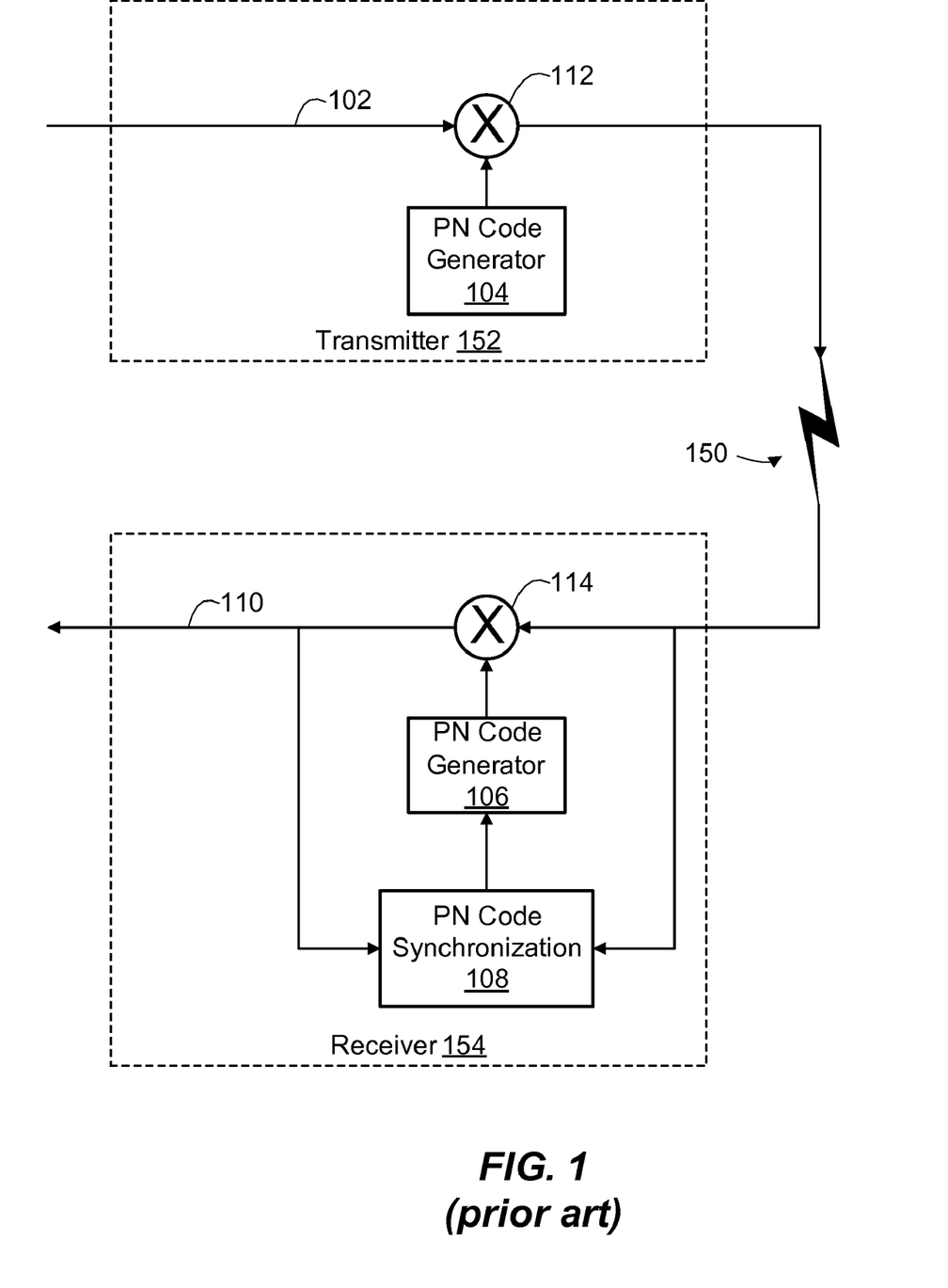
FIG. 1 is a block diagram of a typical CDMA communication system as presently practiced in the art.

FIG. 1 is a block diagram of a typical spread spectrum communication system 100 as presently practiced in the art. The spread spectrum communication system 100 may include a transmitter 152 coupled to a receiver 154 through a communication medium 150. Transmitter 152 may include PN code generator 104 for generating PN codes to use for spreading baseband data 102 as applied to the communication medium 150. The baseband data 102 and the PN codes generated by generator 104 are applied as inputs to element 112 for multiplication. The output of element 112 is then transferred to receiver 154 via communication medium 150.

In operation, receiver 154 receives data from communication medium 150 and applies the received information along with the output of PN code generator 106 to element 114 to be multiplied. The product thereof is applied to path 110 as decoded data for further processing (i.e., baseband data). Those skilled in the art will recognize that appropriate techniques and structure may be applied for decimation of the decoded data if and as required. As presently practiced in the art, PN code generator 106 may be configured by PN code synchronization element 108 to apply the correct PN code sequence synchronized with the transmitted chips for proper decoding of received chips. PN code synchronization element 108 samples the received chips from communication medium 150 and samples the output generated by element 114 to estimate, and eventually converge on, the correct PN code sequence synchronized with the PN code sequence in the transmitted chips from transmitter 152.

The spread spectrum communication system 100 of FIG. 1 may be implemented using either analog electronic devices or with digital electronic devices and digital signal processing techniques. Where digital processing techniques and circuits are applied, the digital product produced by element 112 may be modulated into an analog signal for application to the communication medium. As shown in FIG. 1, element 112 may provide such a function. Similarly, analog signals received from communication medium 150 may be demodulated to generate a digital signal by element 114. Still further, where digital processing techniques are applied, appropriate decimation of the received signal may be performed after decoding the received information by multiplication with the PN code. As shown in FIG. 1, element 114 may provide such a function. The communication system of FIG. 1 is therefore intended to represent all such presently known communication systems that utilize spectrum spreading techniques to spread a signal over available bandwidth of a communication medium 150.

As noted above, PN code synchronization element 108 as presently practiced in the art suffers from numerous complexities and problems when applied to Gold codes used as the PN code for digitizing communicated information. The time that is required to acquire the correct PN code sequence (i.e., to acquire the code) from the received data may be critical in certain applications. Lengthy code acquisition time may risk loss of mission critical data or at least delays in obtaining mission critical data. Presently practiced techniques do not rapidly acquire Gold codes used in such a spread spectrum communication systems.

Figure 2:
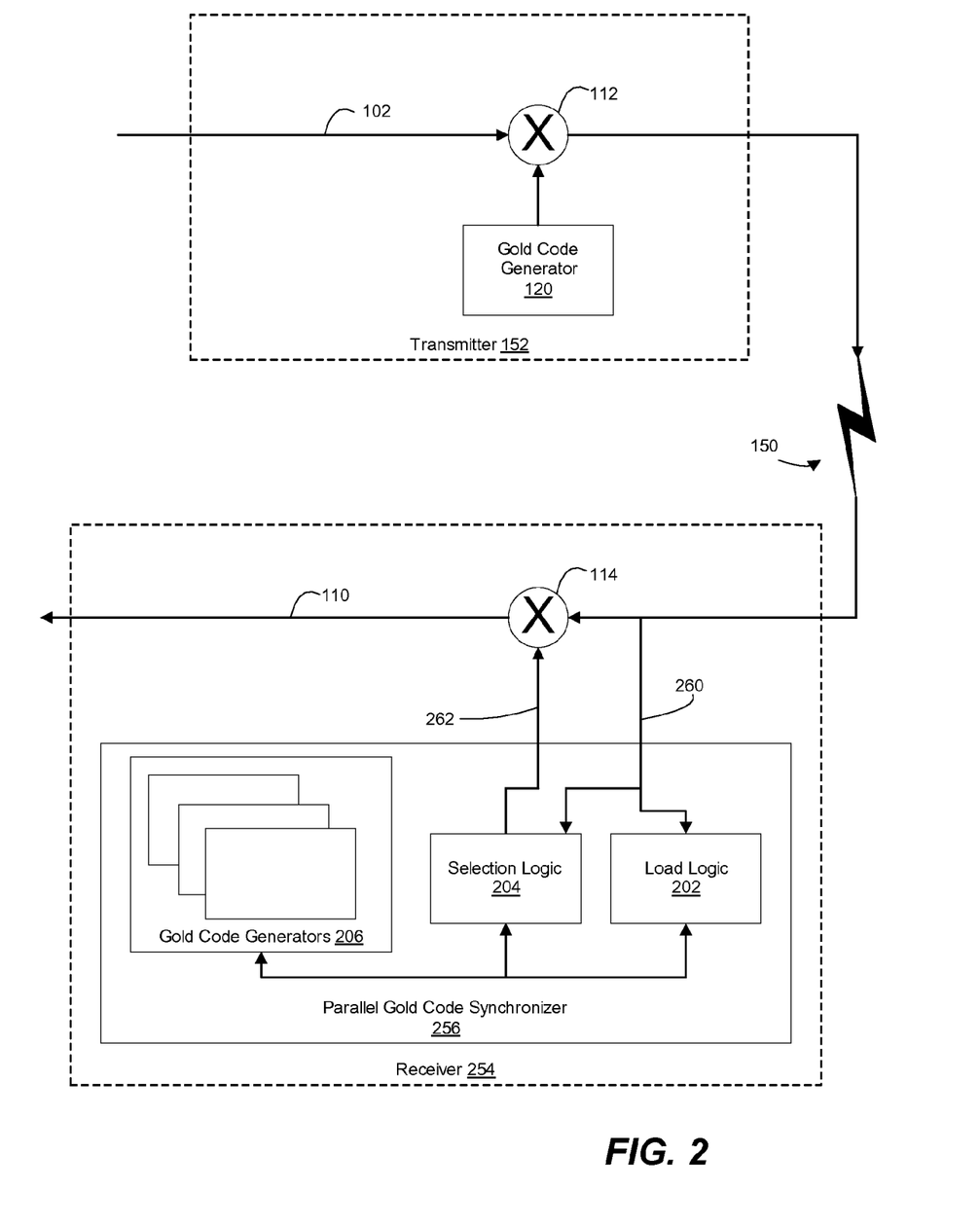
FIG. 2 is a block diagram of a spread spectrum communication system providing features and aspects hereof for rapid code acquisition.

FIG. 2 is a block diagram of a communication system 200 embodying features that improve acquisition of the correct PN code sequences in spread spectrum communications. In particular, system 200 of FIG. 2 may rapidly determine the correct Gold code sequence (or other PN code sequence) used for spread spectrum communication generated by transmitter 152. As above with regard to FIG. 1, transmitter 152 of FIG. 2 may receive applied baseband information on path 102. The baseband information may be digital or analog information. Transmitter 152 may also include Gold code generator 120 for generating Gold codes as the PN code for the spread spectrum communication. The product of the baseband information on path 102 and the output of Gold code generator 120 is determined by element 112 and applied as spread spectrum information to communication medium 150. As above, those skilled in the art will recognize that such a system may be implemented using digitized information and PN codes or analog information and PN codes. Accordingly, digital data may be modulated onto the communication medium 150 in accord with well known modulation techniques and devices.

The transmitted data is received by receiver 254 and applied as one input to element 114 to be multiplied and also applied to parallel Gold code synchronizer 256. The Gold code sequence is determined by parallel Gold code synchronizer 256 as discussed below, and applied via path 262 as a second input to element 114. The product generated by element 114 is then applied to path 110 for further processing within the communication system 200. As noted above with respect to the transmitter 152 of FIG. 2, similar functions may be provided by either analog or digital embodiments of hereof. Any required decimation of the recovered (decoded) digital information may be provided as discussed above.

Still further, those of ordinary skill in the art will recognize a variety of digital and analog filters that may be included with such communication systems including, for example, band pass filters, notch filters, and equalization filters. Such filters may improve signal quality and signal to noise ratio in such communication systems. Though not depicted in FIG. 2, such digital and analog filtration techniques and structures are well known to those of ordinary skill in the art and therefore need not be detailed herein.

As compared to prior techniques, parallel Gold code synchronizer 256 rapidly determines the correct Gold code sequence from the received digital information. Such rapid acquisition of the correct Gold code sequence allows receiver 254 to more rapidly commence and then continue proper decoding and de-interleaving of the received information from communication medium 150.

Figure 3:
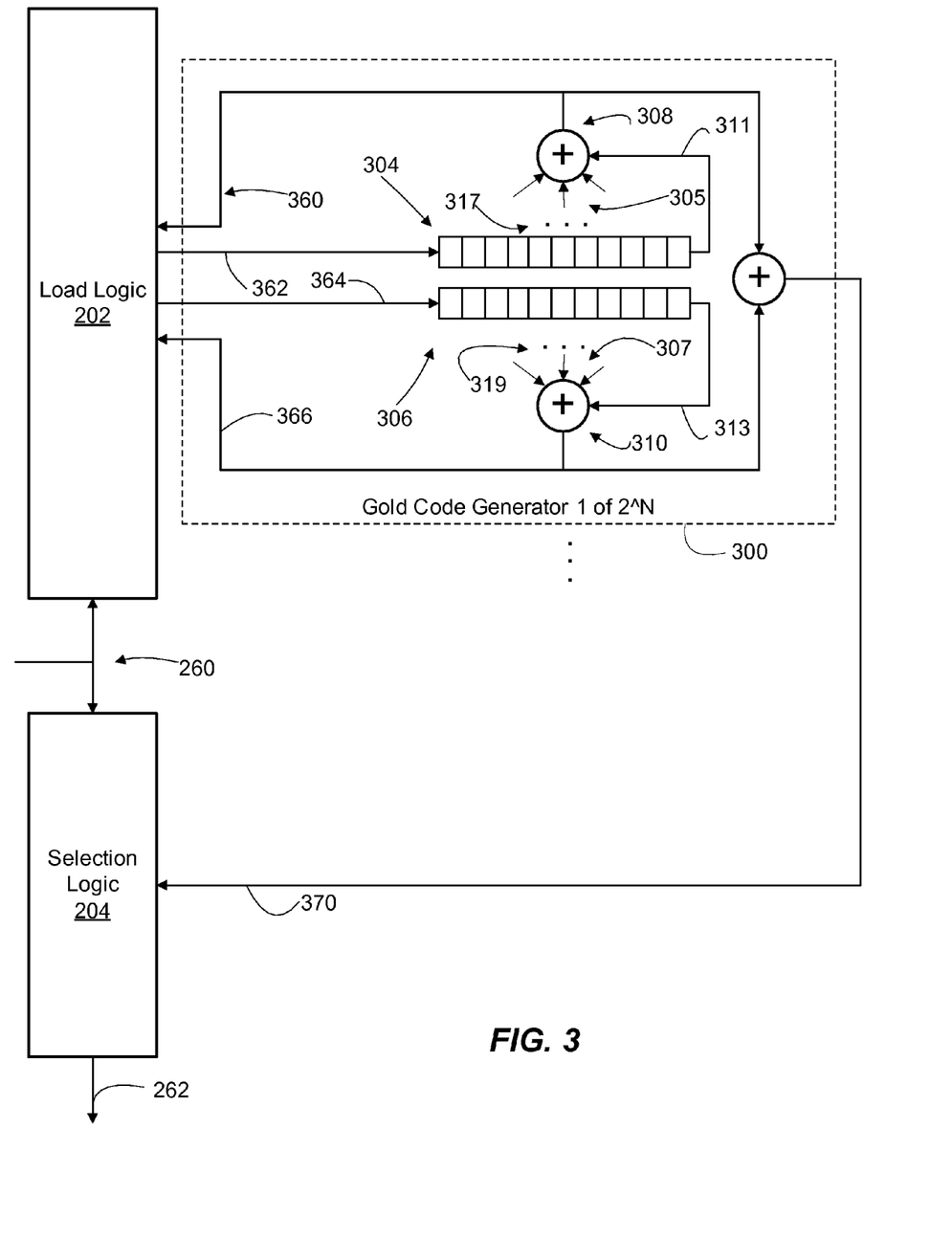
FIG. 3 is a block diagram of features and aspects hereof for rapid Gold code acquisition in a system such as FIG. 2.

As shown in FIG. 2, with FIG. 3 providing additional detail with respect to load logic 202 and selection logic 204, parallel Gold code synchronizer 256 may include a plurality of Gold code generators 206, which are operable substantially in parallel. Load logic 202 samples received digital data via path 260 and loads the multiple Gold code generators 206 with initial values according to methods and structure that are discussed further herein below. By way of example, where the correct Gold code sequence may be represented as a value stored in a number of shift register stages ("N"), load logic 202 loads $2^N$ parallel Gold code generators 206 with bits derived from the first N received chips. The generators 206 are loaded by load logic 202 so as to ensure that every possible Gold code sequence generated using the Gold code shared by this receiver 254 and the corresponding transmitter 152 is evaluated substantially in parallel and in synchrony with the received chip sequence. This parallel process facilitates rapid code lock for continued processing of the decoded information applied to path 110. Selection logic 204 interacts with the processing of load logic 202 and Gold code generators 206 to evaluate each of the $2^N$ Gold code generators 206 and to select the correct Gold code generator, e.g., generator 206A, from among the plurality of parallel operating generators 206. In general, selection logic 204 monitors the operating Gold code generators 206 to determine which generator best correlates with the received sequence of chips on path 260. The Gold code generator so identified as best correlating with the received chips is then controlled by selection logic 204 to apply the output of the correct Gold code generator 206A to path 262 for continued processing of decoded information applied to path 110.

FIG. 3 is a block diagram providing additional details for receiver 254 of FIG. 2 and, more particularly, additional features of parallel Gold code synchronizer 256. Load logic 202 receives incoming chips via path 260 and initially loads each of the plurality of Gold code generators 206 (see FIG. 2) with bits derived from the first N received chips. As above, N is the number of stages in the Gold code generator shift registers. Gold code generator 300 represents one of the plurality of Gold code generators and may be, for example, generator 206A. In one embodiment, a total of $2^N$ generators operate substantially in parallel under control of load logic 202 and selection logic 204.

Each Gold code generator 300 includes two linear shift registers, namely, an "a"-register 304 and a "b"-register 306. Each linear shift register 304 and 306 includes N stages. As shown in FIG. 3, the exemplary shift registers include 11 stages, but any number of bits may be used as appropriate to the communication application.

Each linear shift register 304, 306, has corresponding taps 305, 307 that accept associated register output 311, 313, together with the individual outputs 317, 319 from each of N individual stages in shift registers 304, 306. Taps 305, 307 are respectively coupled as inputs to modulo-2 summing elements 308, 310. The manner of connecting taps 305, 307 to the modulo summing elements 308, 310 are a matter of design choice as appropriate for the desired Gold code. The respective outputs of modulo-2 summing elements 308, 310 are applied to paths 360 and 366 for further processing as input to load logic 202.

Load logic 202 generates inputs that are shifted into registers 304, 306 using paths 362 and 364, as discussed in additional detail below. Load logic 202 pre-loads each of the $2^N$ Gold code generators 206 with a corresponding one of the $2^N$ possible combinations of values derived from the first N received chips. Following this pre-load operation, load logic 202 switches the inputs to each shift register of each Gold code generator to provide feedback from the corresponding output of the feedback register. Such a feedback structure allows each Gold code generator to commence generation of a Gold code in accordance with the pre-loaded value therein. In other words, following pre-load of each generator, load logic 202, in effect, couples shift register input path 362 to the corresponding shift register output path 360 and input 364 to output 366 to permit required feedback in operation of each Gold code generator. In one embodiment, this shifting establishes a circular repetition of the allocated values through each of the registers 304, 306.

The sums of the taps produced by summing elements 308 and 310 are applied as inputs to modulo-2 summing element 312 via paths 360 and 366, respectively. The output generated by element 312 is applied as the output of the generator 300 and as an input to selection logic 204 via path 370. For each of the $2^N$ generators 300, separate paths 360, 362, 364, and 366 control the shift registers operations of the corresponding Gold code generator. Further, a separate output path 370 couples the output of each Gold code generator 300 to the selection logic 204.

By there instrumentalities, a $2^N$ quantity of Gold code generators 300 may be utilized to permit features and aspects hereof to evaluate, substantially in parallel, all possible Gold code sequences for a received stream of chips. Each such Gold code generator is substantially identical to the structure discussed herein with respect to Gold code generator 300. Paths 360, 362, 364, and 366 are present between load logic 202 and each corresponding Gold code generator 300. In like manner, an output signal of Gold code generator 300 is applied via a corresponding path 370 to selection logic 204 for each such parallel Gold code generator 300.

Selection logic 204 selects the correct generator's output to be applied to path 262 for continued decoding operation based on the level of correlation for each of the multiple Gold code generators relative to the stream of received chips. The output of the correct the Gold code generator so selected by selection logic 204 is then applied to path 262 through multiplexing techniques and structures within selection logic 204. Such multiplexing features are well known in the art and need not be further discussed herein.

Although FIG. 3 illustrates a particular embodiment, any other appropriate form of taps 305, 307 may be used to connect stages of the a-register 304 with the associated summing element 308, and stages of the b-register 306 with the associated summing element 310. Such linear shift registers with static or dynamic tap structures are well known to those of ordinary skill in the art.

Further, the a-register 304 and the b-register 306 may include any number of stages that are appropriate to the particular Gold code communication application. FIG. 3 represents one possible parallel Gold code generator structure that may be coupled to load logic 202 and selection logic 204. Numerous equivalent structures for such Gold code generators will be readily apparent to those of ordinary skill in the art.

The foregoing instrumentalities are not limited to use in conjunction with Gold codes. The structure shown and described in FIG. 3 is equally applicable to systems using other PN or RPN codes. These other systems may, for example, beneficially apply features and aspects providing an array of multiple PN code generators 300 operating in parallel to evaluate multiple PN code sequences and rapidly identify a correct code sequence correlated with the incoming chips for continued decoding operation. Use of Gold codes is merely representative of one particularly useful application of the features and aspects hereof.

As discussed further herein below with respect to load logic 202, following initial pre-load of each Gold code generator 300, linear shift registers 304 and 306 may operate as feedback shift registers under control of load logic 202. In other words, output signal path 360 may be controllably looped back to input path 362 and path 366 may be looped back to path 364. Such feedback structures are used in operating the Gold code generators, under control of load logic 202, following initial loading of the Gold code registers. Such feedback loop structures of linear shift registers, e.g., with clock-based shifting, and the use of same for PN code generation are both well known to those of ordinary skill in the art.

Figure 4:
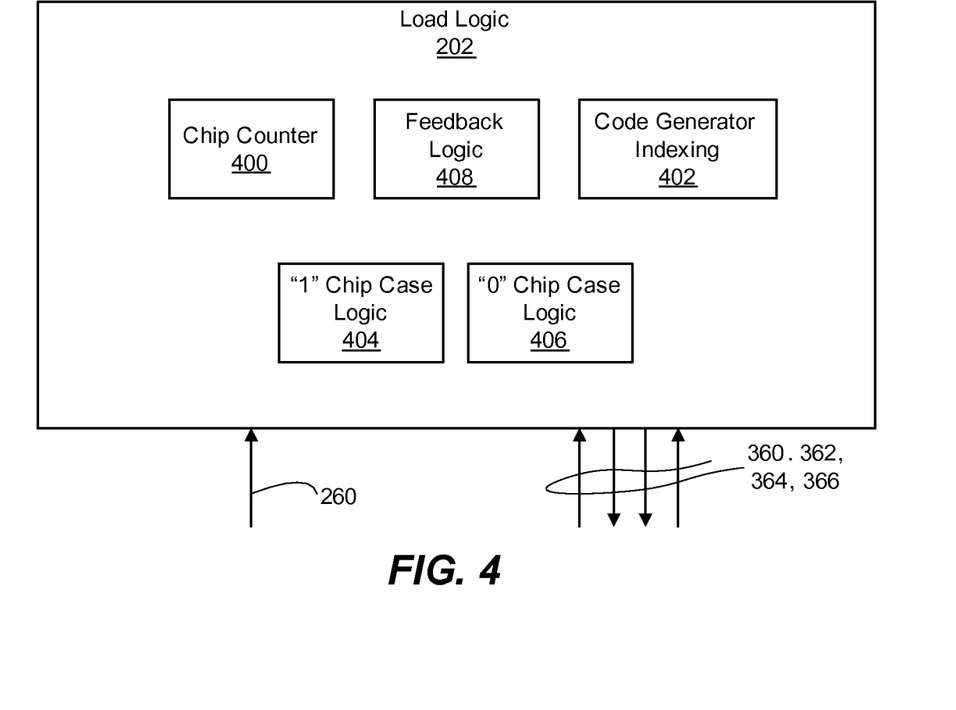
FIG. 4 is a block diagram of functional elements in load logic such as that of FIGS. 2 and 3.

FIG. 4 provides additional detail with respect to one embodiment of elements that may be used within load logic 202. As noted above, load logic 202 receives a stream of input chips on path 260. Load logic 202 also receives and generates signals that are allocated to each of the plurality of Gold code generators 300, as shown in FIG. 3. For each Gold code generator 300, the output of each summing element (coupled to the taps of each shift register) is received by load logic 202 on a corresponding path 360 and 366. Data applied from the load logic to each of the shift registers of each Gold code generator may be applied to corresponding paths 362 and 364, respectively, for each code generator.

Initially, load logic 202 generates bits to be shifted into the a-register 304 and the b-register 306 of each Gold code generator 300 (see FIG. 3; not shown in FIG. 4). For the first N chips that are received, as determined by chip counter element 400, "0" chip case logic 406 controls loading of appropriate bits into the a and b registers 304, 306 of each Gold code generator 300 in response to receipt of a "0" chip. In like manner, "1" chip case logic 404 provides loading of appropriate bits into A and B shift registers of each Gold code generator in response to receipt of a "1" chip. Gold code generator indexing 402 is operable in conjunction with logic elements 404 and 406 to determine which bit patterns are to be loaded into each of the $2^N$ Gold code generator 300 to assure that all possible Gold code sequences are evaluated by the $2^N$ Gold code generators 300 when operating substantially in parallel.

Once the initial bit values are loaded into each of the plurality of Gold code generators 300, as determined by chip counter 400, feedback logic 408 switches signal paths 362, 364 associated with each Gold code generator 300 to commence normal feedback shift register operations in response to receipt of further chips. In particular, path 360 for a particular Gold code generator is looped back as a feedback signal applied to path 362 and hence applied as an input to the feedback shift a-register 304. In like manner, signals received on path 366 are looped back to path 364 as feedback input to shift b-register 306 of each Gold code generator 300.

Figure 5:
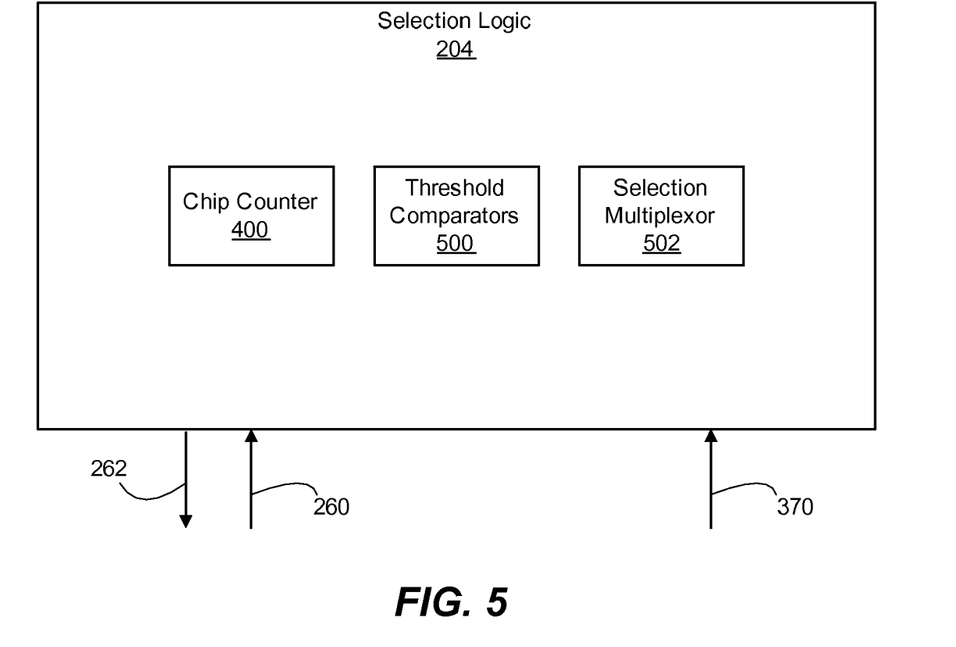
FIG. 5 is a block diagram of functional elements in selection logic such as that of FIGS. 2 and 3.

FIG. 5 provides additional details that pertain to one embodiment of selection logic 204. As noted above, selection logic 204 receives a stream of transmitted chips on path 260 and receives output from each of the multiple Gold code generators 300 each on a corresponding path 370. After load logic 202 signals completion of the initial loading of the multiple Gold code generators, as indicated by chip counter 400, threshold comparators 500 then monitor the output of each of the multiple Gold code generators to measure the degree of correlation for each Gold code generator as compared to the received chip sequence on path 260. When threshold comparators 500 successfully identify the Gold code generator having the highest correlation to the received chip sequence, selection multiplexer 502 is operable to couple the signal path 370 of the selected Gold code generator to signal path 262 to permit further decoding of received chips.

FIGS. 4 and 5 illustrate functional logic elements that are present within exemplary embodiments of each of load logic 202 and selection logic 204, respectively. Still further, the elements depicted in FIGS. 2, 3, 4 and 5 may be implemented as discrete electronic circuits, custom integrated circuit packages, programmable application specific integrated circuits (ASICs), programmed instructions in a suitable processor, etc. In other words, those skilled in the art will recognize the equivalency of hardware, firmware and software implementations of the features and aspects hereof.

The taps 305, 307 of the shift registers 304, 306 in a Gold code generator 300, in essence, determine the sequence of chips generated by the Gold code generator 300. As is well known to those in the art, the sequence of chips is a repeating pattern that repeats after a number of generated chips. The initial value that loaded into the Gold code generator 300 by load logic 202 determines, in essence, what part of that repeating sequence will be generated by the Gold code generator 300. By varying the initial values loaded in the plurality of Gold code generators of FIGS. 2 and 3, each generator may be configured to generate one of the set of possible Gold codes for the shift register tap configuration. One of the plurality of generators will therefore correlate with the sequence being generated by the corresponding transmitter thus allowing rapid code acquisition.

Load logic is generally configured to assure that each possible pre-loaded value for the Gold code generators is evaluated substantially in parallel. So doing allows the code sequence to be rapidly acquired in the incoming sequence of chips. The initial N received chips are used to pre-load the $2^N$ generators with each of the possible $2^N$ values represented by the N received chips.

The load logic may be understood from an algorithmic presentation thereof. Those skilled in the art will recognize numerous equivalent techniques to implement such an algorithm in application specific integrated circuits, full custom circuits, or as suitable programmed instructions to a general or special purpose processor.

Let the A and B registers in each Gold code generator of the receiver be represented as two $2^N \times N$ matrices, where N is the number of stages in the Gold code. In other words $2^N$ generators by N stages each. The A and B shift registers may therefore each be indexed as $A_{i,j}$ and $B_{i,j}$ where i is the generator index number ranging from 0 to $2^N-1$ and j is the stage index number ranging from 0 to N−1. The A and B registers in each Gold code generator are pre-loaded with values derived from the first N received chips ($C_0$ through $C_{N-1}$). The load logic hereof assures that each of the Gold code generators are loaded with one of the possible $2^N$ values derived from the first N received chips.

In one aspect hereof, the j-th stage of each N-stage Gold code generator may be loaded as a function of the j-th received chip where j ranges from 0 through N−1 as follows:

if ($C_j$=0) then $A_{i,N-1-j}$=0; $B_{i,N-1-j}$=0 OR $A_{i,N-1-j}$=1; $B_{i,N-1-j}$=1 else $A_{i,N-1-j}$=0; $B_{i,N-1-j}$=1 OR $A_{i,N-1-j}$=1; $B_{i,N-1-j}$=0 where i ranges from 0 through $2^N-1$ as determined by indexing logic. As noted above, such indexing logic may use any of numerous well known indexing techniques including, for example, simple modulo arithmetic to assure that all $2^N$ generators are pre-loaded with a different value of the $2^N$ possible pre-load values. The indexing logic may select from the two optional pre-load values in response to each received chip and according to the indexing technique to assure all possible values are pre-loaded in the generators. Such indexing techniques and associated circuits would be readily recognized by those skilled in the art.

In another aspect hereof, the A and B registers of the $2^N$ Gold code generators each having N stages may be loaded as follows in response to the indicated received chip values $C_j$:

$$A_{i,N-1-j} := \frac{1-(-1)^{floor(i \cdot 2^{-j})}}{2} \quad (1)$$

| | |
|---|---|
| $C_j = 0$ | $B_{i,N-1-j} = A_{i,N-1-j}$ |
| $C_j = 1$ | $B_{i,N-1-j} = \mod(A_{i,N-1-j}+1,2)$ (2) | where: i is a range variable from 0 to $2^N-1$, $C_j$ is the j-th received chip, j=0 to N−1, and floor(x) is the integer value of x. It may be noted that in the above pre-loading aspect, the values in the 1-register are a function of the chip index "j" but not the chip value "$C_j$." Those skilled in the art will note that, in accord with equation 1 above, the value loaded in the a-register of each Gold code generator is therefore not dependent on the received chip value. Therefore, the a-register of each generator may be pre-loaded at initialization of the receiver and need not be modified in response to received chips. The values to be pre-loaded into each a-register may therefore be statically saved in a memory component such as a read-only memory (ROM) or other similar memory component.

Figure 6:
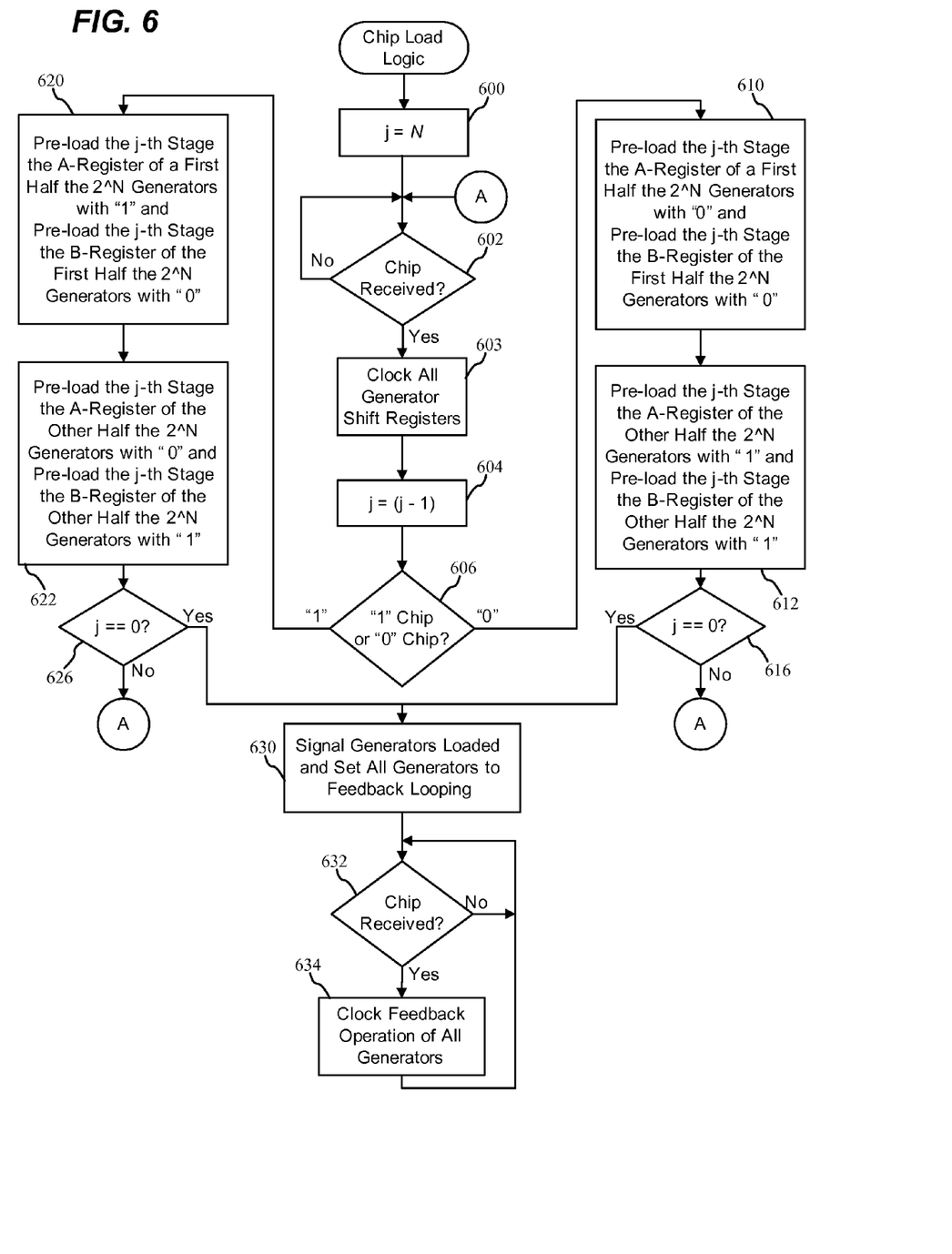
FIG. 6 is a flowchart of a method providing aspects hereof to control the pre-loading of PN code generators to permit rapid code acquisition.

FIG. 6 is a flowchart providing another description of an exemplary load logic operation. Element 600 first sets index variable i to N (the number of bits or stages in the Gold code). Element 602 then awaits receipt of a next chip from the transmission medium. Upon receipt of the next chip, element 604 decrements index counter variable i. Element 606 then determines whether the received chip represents a "0" chip or a "1" chip.

As noted above, when Gold codes are used as PN codes, each received chip represents a modulo-2 sum of two bits shifted through registers of the Gold code generator, the first bit shifting through the a-register and a second bit shifting through the b-register of each Gold code generator. For "0" received chip, two possible cases exist to represent the modulo-2 sum of two bits that generated the "0" chip. The A and B registers either both need to shift in a 0 bit or both need to shift in a 1 bit. In like manner, a received "1" chip indicates that the Gold code generator shift registers should receive a 1 and 0 bit in the A and B registers, respectively, or a 0 and 1 bit value, respectively.

As noted above, load logic must assure that the plurality of Gold code generators evaluate every possible sequence of Gold code encoded received chips to determine the correct Gold code generator correlated with the received chips. Indexing logic as described above operates to determine which Gold code generators shall receive a first case of bit values and which shall receive a second case of bit values corresponding to each received chip.

In response to a received "0" chip, element 610 shifts a 0 bit value into both the A and B registers for a first half of the multiple Gold code generators. Element 612 shifts a 1 bit value into the A and B registers for the other half of the multiple Gold code generators. The first half and second half may be distinguished based upon the indexing logic discussed above as a mathematical algorithm. Other equivalent indexing schemes will be readily apparent to those skilled in the art to assure that the $2^N$ Gold code generators are pre-loaded with all possible $2^N$ combinations of values derived from the first N received chips.

Following the loading of bits by elements 610 and 612, element 616 determines whether additional bits are to be loaded into the shift registers of each Gold code generator as determined by chip or stage index number variable j. If further bits need to be loaded into the shift registers of the Gold code generators, processing continues by looping back to element 602 to await receipt of a next chip. If no further bits need be loaded into the shift registers of the Gold code generators, processing continues at element 630, as described further below, to signal completion of the loading of the Gold code generators' registers. Otherwise, processing continues by looping back to element 602 to await receipt of another chip.

If element 606 determines that the next received chip is a "1" chip value, elements 620 through 626 are operable as described above with respect to elements 610 through 616 to load appropriate bit values in the shift registers of the Gold code generators representing the two possible states for a received "1" chip value. Indexing of the appropriate stage and generator to be loaded are as above to load a first half with appropriate values and a second half with appropriate values. In particular, element 620 loads half the Gold code generator shift registers with bit values of 1 and 0 in the A and B shift registers, respectively while element 622 loads bit values of 0 and 1 in the A and B registers, respectively, of the other half. Element 626 determines whether additional chips need be received and if not processing continues with element 630 as discussed below. Otherwise, processing loops back to element 602 to await receipt of another chip for pre-loading the Gold code generators.

Once all Gold code generator shift registers have been pre-loaded with all possible combinations of code sequences, element 630 signals to the selection logic discussed above that selection may proceed. In addition, element 630 switches all shift registers of all Gold code generators into a feedback configuration for normal operation of the Gold code generators, which generate Gold codes based on their respective pre-loaded values. As noted above, the load logic may couple the shift register outputs applied as input to the load logic directly to the shift register input signal paths for effectuating the desired feedback loop.

With the Gold code generators pre-loaded with all possible sequences of bits corresponding to the initial N received chips, element 632 simply awaits receipt of a next chip and, when received, element 634 clocks the shift registers of all Gold code generators to shift another stage thus generating another Gold code value. This process continues as the selection logic, discussed further herein below, attempts to identify the best correlated generator to use for continued communication decoding.

Figure 7:
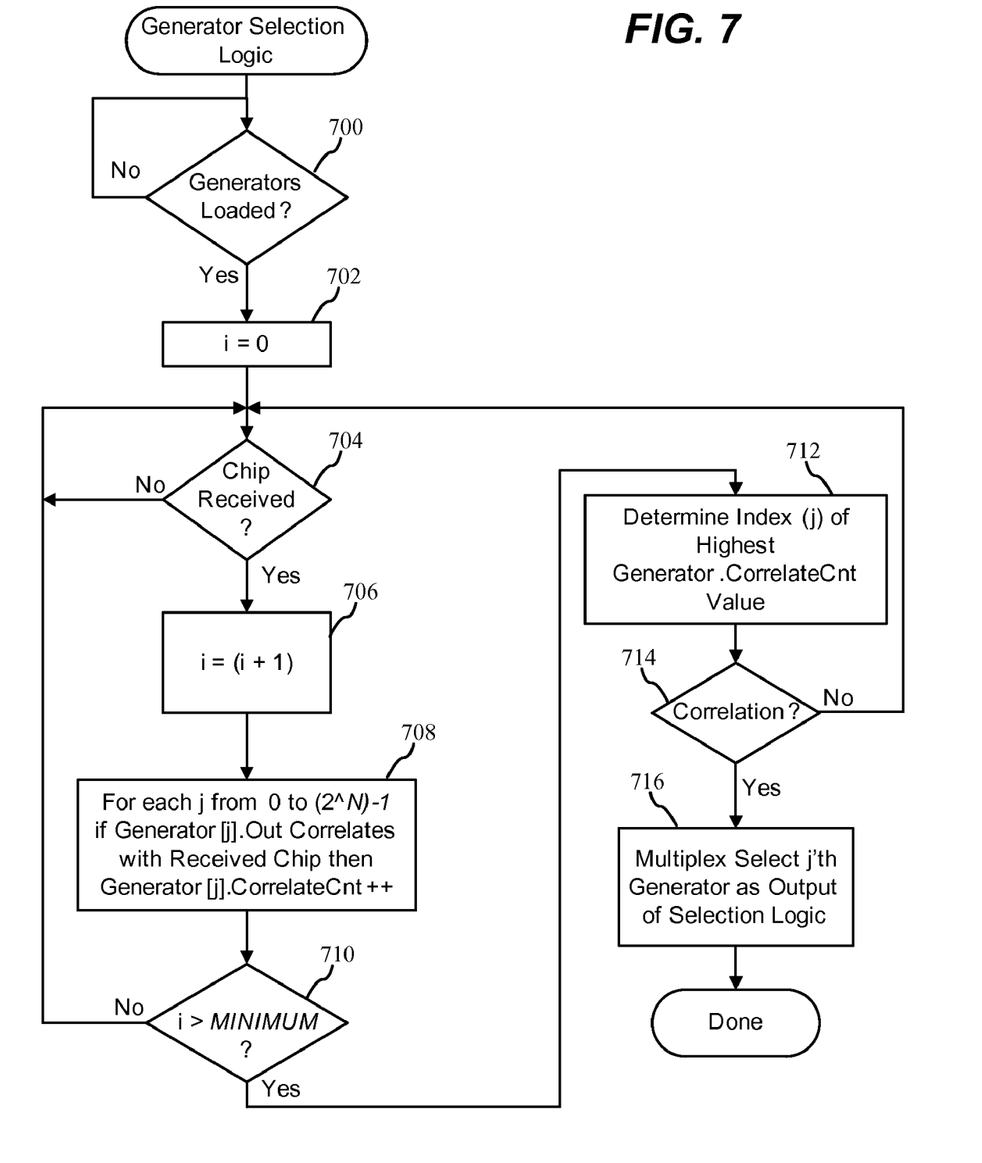
FIG. 7 is a flowchart of a method providing aspects hereof to select a best correlated code generator from a plurality of generators operating substantially in parallel.

FIG. 7 is a flowchart describing an exemplary algorithmic representation of operation of selection logic 204 as discussed above. Element 700 is operable to await receipt of a signal from the load logic indicating that all Gold code generators have been successfully pre-loaded and that selection of the best correlated generator may commence. As noted above, such a signal may be generated as a discrete logic signal exchanged between the load and selection logic or may be represented as the terminal count condition generated by counters associated with both load logic and selection logic.

Upon sensing completion of pre-loading of the generators, element 702 then initializes index variable i to begin counting occurrences of received chips in preparation for determining correlation measures of the various Gold code generators. Any valid correlation measure of a PN code may require some minimum number of received chips to compare against the PN code generator output values. The actual or maximum number of chip times required to identify the best correlated Gold code generator may vary in accordance with particular aspects and attributes of each particular application. Failure to sense adequate correlation within a specified maximum number of chip times may be considered an error in certain applications. Such error processing is well-known to those skilled in the art and need not be addressed in further detail herein. Factors involved in the time (number of chips) required to determine correlation may include: the number of bits or stages in the assigned Gold code, environmental factors including noise and transmission medium quality, and other factors. The maximum time required to determine such correlation will be determined as a matter of design choice in a particular embodiment hereof.

Elements 704 through 714 are then iteratively operable to await receipt of each new chip from the communication medium. When element 704 determines that a next chip has arrived, element 706 is operable to increment index counter i indicating receipt of another chip. Element 708 then increments a counter or other indicia associated with each Gold code generator to indicate which generators correlate with the received chip. As noted above, following pre-load of the Gold code generators, all generators are allowed to operate normally generating Gold codes in response to receipt of each new chip. Other generators that do not correlate to the received chip do not have their respective counters so incremented. Element 710 then determines if additional chips are expected before correlation may be determined—i.e., if the MINIMUM number of chips have been received such that correlation of one generator may be determined. If more chips are required, processing continues by looping back to element 704 to await receipt of a next chip. Otherwise, processing continues with element 712 to attempt to determine which of the plurality of Gold code generators best correlates with the received sequence of chips.

The best correlated Gold code generator is identified by operation of element 712 by the index value j. Element 714 then determines whether the best correlated generator is adequately correlated, in other words, whether the correlation exceeds a predetermined threshold. If element 714 determines that none of the generators adequately correlate, processing continues by looping back to element 704 to await receipt of additional chips.

If adequate correlation is found for one of the generators, element 716 is then operable to select multiplexing logic elements within the selection logic. The multiplexing elements serve to selectively couple the best correlated Gold code generator directly to the communication path within the receiver for continued decoding operation. Such multiplexing selection logic elements are well known to those of ordinary skill in the art and therefore need not be further detailed herein.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A receiver adapted for coupling to a communication medium, said receiver comprising:

a plurality of PN code generators each having an input signal path and an output signal path;

load logic coupled to the input signal path of each of the plurality of PN code generators and adapted to receive chips from the communication medium and adapted to pre-load the plurality of PN code generators with information derived from the received chips and adapted to operate the plurality of PN code generators substantially in parallel following pre-loading thereof;

selection logic coupled to the output signal path of each of the plurality of PN code generators to select a correlated PN code generator from the plurality of PN code generators; and a decoder coupled to the selection logic for decoding data received from the communication medium using the correlated PN code generator.

2. The receiver of claim 1 wherein each of the plurality of PN code generators comprises a Gold code generator.

3. The receiver of claim 2 wherein each generator of the plurality of Gold code generators comprises a first N bit shift register and second N bit shift register and wherein the plurality of Gold code generators comprises $2^N$ Gold code generators, wherein N is the number of shift register stages to hold a Gold code sequence as a value.

4. The receiver of claim 3 wherein the load logic comprises:

first logic, responsive to receipt of a 0 chip value from the communication medium, adapted to load a logic 0 bit value into the first N bit shift register and into the second N bit shift register of each generator of a first half of the plurality of Gold code generators and adapted to load a logic 1 bit value into the first N bit shift register and into the second N bit shift register of each generator of a second half of the plurality of Gold code generators; and second logic, responsive to receipt of a 1 chip value from the communication medium, adapted to load a logic 1 bit value into the first N bit shift register and the load a logic 0 bit value into the second N bit shift register of each generator of the first half of the plurality of Gold code generators and adapted to load a logic 0 bit value into the first N bit shift register and adapted to load a logic 1 bit value into the second N bit shift register of each generator of the second half of the plurality of Gold code generators, wherein the first logic and the second logic are operable to assure all possible combinations of N bits are loaded into the first and second N bit shift registers of the plurality of Gold code generators.

5. The receiver of claim 4 wherein the load logic further comprises:

indexing logic to selectively associate each generator of the plurality of Gold code generators with said first half or with said second half.

6. The receiver of claim 3 wherein the load logic further comprises:

logic adapted to load the first and second N bit shift registers as follows:

let the $A_{i,j}$ represent the first N bit shift registers of the $2^N$ generators as a $2^N \times N$ matrix and let $B_{i,j}$ represent the second N bit shift registers of the $2^N$ generators as a $2^N \times N$ matrix where N is the number of stages in the Gold code where i is the generator index number ranging from 0 to $2^N - 1$ and j is the stage index number ranging from 0 to N-1, let $C_0$ through $C_{N-1}$ represent the first N received chips, then the $A_{i,j}$ values are loaded as:

$$A_{i,N-1-j} := \frac{1 - (-1)^{floor(i \cdot 2^{-j})}}{2}$$

and the $B_{i,j}$ values are loaded as a function of $C_j$ and $A_{i,j}$ as follows:

| $C_j = 0$ | $B_{i,N-1-j} = A_{i,N-1-j}$ |
| $C_j = 0$ | $B_{i,N-1-j} = \mod(A_{i,N-1-j} + 1, 2)$ | where: floor(x) is the integer value of x.

7. The receiver of claim 1 wherein the load logic further comprises:

feedback logic, responsive to completion of the pre-loading of the plurality of PN code generators, to selectively couple the output signal path of each PN code generator to the corresponding input signal path of each PN code generator to permit operation of the plurality of PN code generators.

8. The receiver of claim 1 wherein the selection logic further comprises:

autocorrelation detection logic to determine the autocorrelation level of each of the plurality of PN code generators; and threshold comparison logic to compare the autocorrelation level of each of the plurality of PN code generators to a predetermined threshold to identify a correlated PN code generator.

9. A receiver comprising:

a plurality of Gold code generators operable substantially in parallel, each Gold code generator including a first shift register having N stages, and a second shift register having N stages, wherein N is the number of shift register stages to hold a Gold code sequence as a value;

a selector for selecting a correlated generator from said plurality of Gold code generators to use for decoding of received chips;

a pre-loader coupled to the plurality of Gold code generators for pre-loading the first and second shift registers in each generator prior to operating the plurality of Gold code generators; and feedback logic, responsive to the pre-loader and associated with each generator, to selectively couple an output of each generator to an input of said each generator.

10. The receiver of claim 9 wherein the selector comprises:

a correlator coupled to an output of each generator to determine the correlation of each generator to a sequence of received chips, wherein the selector is operable to select a best correlated generator as determined by evaluating the sequence of receiver chips.

11. The receiver of claim 10 wherein the correlator comprises:

a threshold comparator that compares the correlation of each generator with a predetermined threshold correlation level.

12. The receiver of claim 11 wherein the pre-loader couples to the plurality of Gold code generators for pre-loading the first and second shift registers in each generator prior to operating the plurality of Gold code generators wherein each generator is pre-loaded with a unique pre-load value selected from $2^N$ possible values where N is the number of stages in the first and second shift registers in said each generator.

13. The receiver of claim 9 wherein the plurality of Gold code generators comprises:

$2^N$ Gold code generators where N is the number of stages in the first and second shift registers of each generator.

14. A method operable in a digital communication receiver, the method comprising:

receiving digitally encoded information from a communication medium wherein a PN code is used to spread the information over available communication bandwidth of the communication medium;

operating a plurality of PN code generators substantially in parallel with one another to acquire a correct PN code sequence from the received information, the correct PN code sequence determined by a best correlated PN code generator, wherein each PN code generator includes a first shift register having N stages, and a second shift register having N stages, wherein N is the number of shift register stages to hold a PN code sequence as a value; and decoding the received information using the best correlated PN code generator.

15. The method of claim 14 further comprising:

pre-loading the first and second shift registers in each PN code generator prior to operating said each PN code generator.

16. The method of claim 15 wherein the plurality of PN code generators comprises $2^N$ Gold code generators and wherein the first and second shift registers in each Gold code generator include N stages, N being the number of shift register stages to hold a Gold code sequence as a value, and wherein the step of pre-loading further comprises:

pre-loading said first and second shift registers of each Gold code generator with a corresponding value of $2^N$ possible values.

17. The method of claim 16 wherein the step of pre-loading further comprises:

deriving for each Gold code generator a value for pre-loading from N received chips of the received information.

18. The method of claim 14 further comprising:

selecting the best correlated PN code generator by comparing outputs from each of the plurality of PN code generators with a sequence of chips of the received information.

19. An apparatus operable in a digital communication receiver, the apparatus comprising:

receiving means for receiving digitally encoded information from a communication medium wherein a PN code is used to spread the information over available communication bandwidth of the communication medium;

code synchronizer means for operating a plurality of PN code generators substantially in parallel with one another to acquire a correct PN code sequence from the received information, the correct PN code sequence determined by a best correlated PN code generator, wherein each PN code generator includes a first shift register having N stages, and a second shift register having N stages, wherein N is the number of shift register stages to hold a PN code sequence as a value; and means for decoding the received information using the best correlated PN code generator.

20. The apparatus of claim 19 further comprising:

load logic means for pre-loading the first and second shift registers in each PN code generator prior to operating said each PN code generator.

21. The apparatus of claim 20 wherein the plurality of PN code generators comprises $2^N$ Gold code generators and wherein the first and second shift registers in each Gold code generator include N stages, N being the number of shift register stages to hold a Gold code sequence as a value, and wherein the load logic means comprises:

Gold code load logic means for pre-loading said first and second shift registers of each Gold code generator with a corresponding value of $2^N$ possible values.

22. The apparatus of claim 21 wherein the Gold code load logic means comprises:

means for deriving for each Gold code generator a value for pre-loading from N received chips of the received information.

23. The apparatus of claim 19 further comprising:

selection logic means for selecting the best correlated PN code generator by comparing outputs from each of the plurality of PN code generators with a sequence of chips of the received information.

* * * * *